J. J. BENNETT.
TROLLEY HEAD.
APPLICATION FILED JAN. 21, 1911.

1,004,618.

Patented Oct. 3, 1911.

Inventor
Joseph J. Bennett.
By Edward N. Pagelsen, Attorney

Witnesses
Albert A. Hofmann
Elizabeth M. Brown

COLUMBIA PLANOGRAPH CO., WASHINGTON, D. C.

UNITED STATES PATENT OFFICE.

JOSEPH J. BENNETT, OF PITTSFIELD, MASSACHUSETTS.

TROLLEY-HEAD.

1,004,618.  Specification of Letters Patent.  Patented Oct. 3, 1911.

Application filed January 21, 1911. Serial No. 603,788.

*To all whom it may concern:*

Be it known that I, JOSEPH J. BENNETT, a citizen of the United States, and a resident of Pittsfield, in the county of Berkshire and State of Massachusetts, have invented a new and useful Trolley-Head, of which the following is a specification.

My invention relates to improvements in the supporting devices for trolley wheels, and its object is to provide a trolley-head having an easily removable wheel and its supporting shaft, wherein means are provided for permitting the wheel to follow curves in the trolley wire, and wherein means are provided for insuring free conduction of the current from the wheel to the pole.

Figure 1:
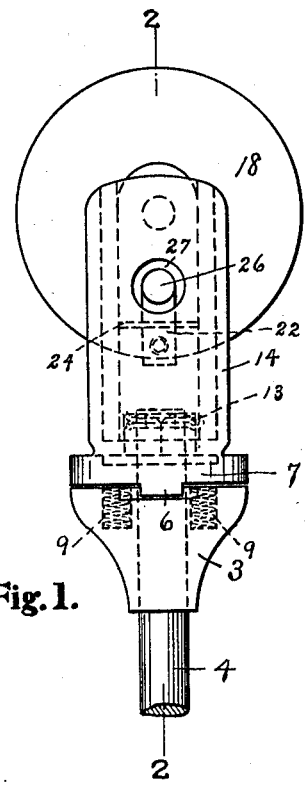
Figure 2:
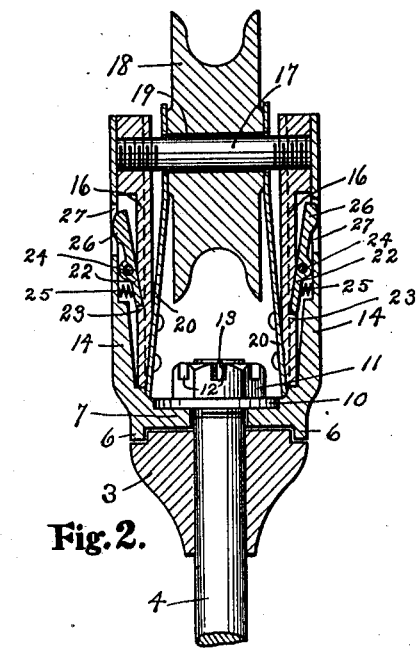
Figure 3:
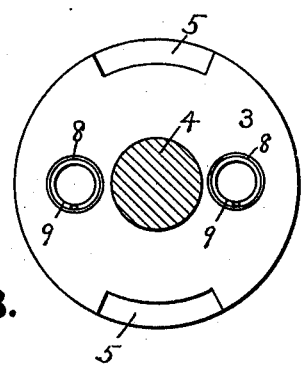
Figure 4:
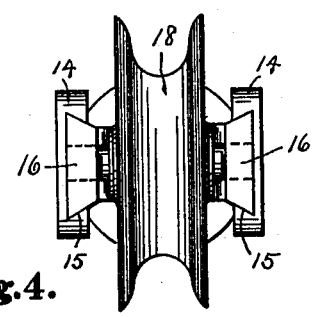

In the accompanying drawing which shows the preferred embodiment of this invention, Figure 1 is a side elevation of the trolley-head. Fig. 2 is a longitudinal section on the line 2—2 of Fig. 1. Fig. 3 is a plan of the base of the head showing the contact springs. Fig. 4 is a plan of the head.

Similar reference characters refer to like parts throughout the several views.

The base 3 of the head is rigidly secured to the pole 4 in any desired manner, or formed integral therewith, and has notches 5 in its upper face to receive the tongues 6 on the bottom face of the harp 7, and holes 8 in which are placed the contact springs 9. The bottom plate of the harp has an opening for the upper threaded end of the trolley pole 4, and is countersunk for the washer 10, secured or integral with the nut 11. The nut has notches 12 adapted to receive the ends of the cotter pin 13 which passes through a small hole in the upper end of the pole 4 and prevents loss of the nut and harp. The side arms 14 of the harp have dove-tail grooves 15 in which are slidable the plates 16 which are connected by the wheel-shaft 17, preferably by screw-threaded connection.

The trolley wheel 18 is revolubly mounted on the shaft 17 and may have any desired bearing, a graphite bushing 19 preferred. Flat springs 20 are secured to the lower ends of the plates 16 and bear against the wheel, keeping the wheel central between the plates 16, and also providing a good circuit between the wheel and the harp with which these springs engage at their lower ends.

The side plates 16 are cut away below the shaft 17, as shown in Fig. 2, and have shoulders 23 adapted to be engaged by the latches 22, mounted on the pins 24 which extend across the grooves 15. Springs 25 hold the lower ends of the latches inward, while the rounded upper ends or thumb-pieces 26 can be reached through the holes 27 in the side arms 14.

The sector-shaped notches 5 permit the harp to rotate a certain predetermined distance on its base, and therefore permit the trolley wheel to adapt itself to curves in the trolley wire. The inevitable movement, however slight, between the ends of the springs 20 and the harp, will keep the contacting surfaces bright and insure a good electric circuit. Similarly the wear between the upper ends of the springs and the wheel will also keep the surfaces clean and insure the circuit. The engagement of the springs 9 and the constantly moving bottom face of the harp will serve the same purpose.

Should a wheel become worn or broken, the thumb-pieces 26 are depressed through the holes 27, causing the latches to release the shoulders 23 and permitting the side plates 16 to be drawn out of the slots 15. Unscrewing one side plate 16 releases the wheel.

The details of construction may be modified by those skilled in the art without departing from the spirit of my invention.

Having now explained my improvements what I claim as my invention and desire to secure by Letters Patent is:—

1. In a trolley head, the combination of a base secured to the trolley pole and provided with longitudinal bores and segmental notches, a harp revolubly mounted on the end of the pole and having tongues projecting downwardly into said notches, coil-springs seated in the holes in the base and engaging the harp, and a nut and washer on the end of the pole, said harp being countersunk to form a bearing for the washer.

2. In a trolley head, the combination of a base, a harp revolubly mounted on the base and provided with dove-tail grooves in the inner sides of its arms, plates slidable in said grooves and having exterior shoulders, latches mounted in said grooves and engaging the shoulders to hold the plates in position, a shaft mounted in the upper end of the plates, a trolley wheel revoluble on said shaft and a spring secured to the lower end of each plate having its upper end in engagement with said wheel and its lower end engaging said harp.

3. In a trolley head, the combination of a base secured to the trolley pole and provided with holes parallel to the pole and segmental notches, a harp revoluble on the pole and having tongues extending into said notches, a shaft and trolley wheel at the upper end of the harp, and coil springs mounted in the holes in the base to contact with the harp to insure an electric circuit.

4. In a trolley head, the combination of a base, a harp mounted on the base and comprising upright arms grooved on their inner sides, plates slidable in the grooves, a shaft carried by the upper ends of the plates, a wheel on the shaft, and a spring secured to the lower end of each plate having its upper end in engagement with said wheel and its lower end engaging said harp.

In testimony whereof I have signed this specification in the presence of two subscribing witnesses.

JOSEPH J. BENNETT.

Witnesses:
JOHN B. CUMMINGS,
WILLIAM A. BURUS.

Copies of this patent may be obtained for five cents each, by addressing the "Commissioner of Patents, Washington, D. C."